Figure 1:
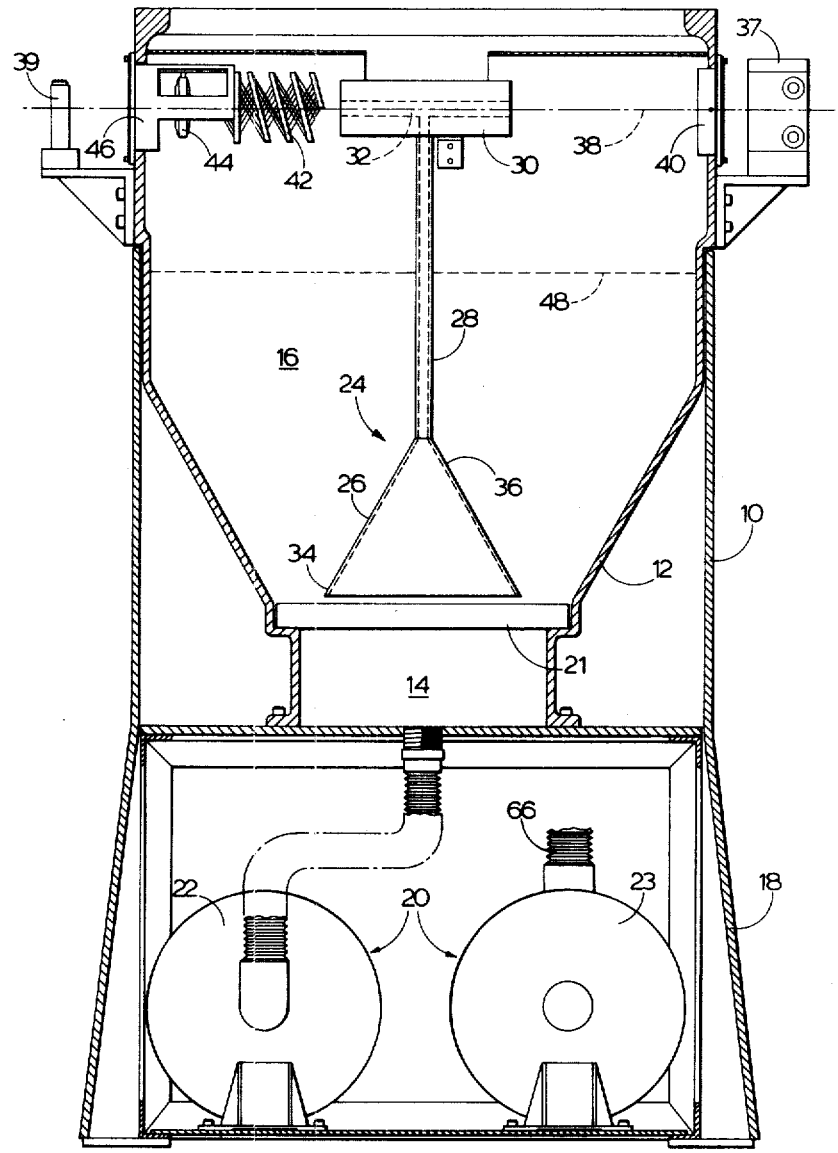

United States Patent [19]

Kane

[11] 4,334,494
[45] Jun. 15, 1982

[54] DUSTING APPARATUS

[75] Inventor: Gary Kane, Stoke-On-Trent, England

[73] Assignee: Lucas Industries Limited, Birmingham, England

[21] Appl. No.: 169,645

[22] Filed: Jul. 17, 1980

[30] Foreign Application Priority Data

Jul. 21, 1979 [GB] United Kingdom ............... 7925517

[51] Int. Cl.³ ...................... B05C 11/06; B05C 19/02
[52] U.S. Cl. ..................................... 118/63; 118/125; 118/308; 118/312; 118/325
[58] Field of Search ............. 118/405, 125, 309, 308, 118/DIG. 5, 312, 63, 325, 326; 55/400, 351, 290

[56] References Cited

U.S. PATENT DOCUMENTS

| | | | |
|---|---|---|---|
| 2,228,129 | 1/1941 | Stephano | 55/408 |
| 2,648,396 | 8/1953 | Kirby | 55/400 X |
| 3,207,618 | 9/1965 | DeHart | 427/182 |
| 3,603,287 | 9/1971 | Christy et al. | 118/309 |
| 4,263,871 | 4/1981 | Gibson | 118/DIG. 5 |

FOREIGN PATENT DOCUMENTS

| | | | |
|---|---|---|---|
| 1383109 | 2/1975 | United Kingdom | 118/DIG. 5 |
| 683809 | 9/1979 | U.S.S.R. | 118/DIG. 5 |

Primary Examiner—John P. McIntosh
Attorney, Agent, or Firm—Scrivener, Clarke, Scrivener and Johnson

[57] ABSTRACT

Apparatus for dusting articles such as electrical cables with a powder such as talc, to prevent the articles sticking together, comprises means for agitating powder in a chamber and means for conveying powder-laden air from the chamber to a dusting nozzle.

For efficient dusting of an article, it is important that a constant uniform flow of powder-laden air is conveyed to the dusting nozzle.

A fluidized bed of dusting powder is created by a fan creating an air flow up through a permeable screen. A conveying nozzle receives some of the air flow, being positioned close to the screen, and comprises a convergent portion which accelerates the flow of powder-laden air to transport it to a discharge portion of the nozzle.

12 Claims, 2 Drawing Figures

DUSTING APPARATUS

Apparatus is known for use in dusting articles with a powder, to discourage the articles from sticking together or to other bodies. One use for such apparatus is in the dusting of electrical wires and cables, either to ease stripping of a subsequently applied insulating layer from a conductor, or to discourage the sticking together of several insulated conductors within a casing of a multi-core cable. The powder may be, for example, talc.

There is described in U.S. Pat. No. 3,886,897 a dusting apparatus comprising a mechanical agitator mounted for rotation in a quantity of dusting powder in a hopper, to create a powder-laden atmosphere around the agitator. An air outlet leads from the hopper, through a valve, to an impeller which serves to drive powder-laden air from the hopper to dusting nozzles adjacent an article to be dusted in a dusting chamber. The valve is adjustable to control the density of powder in the air conveyed to the nozzles, the valve varying a quantity of clean air introduced into the powder-laden air drawn from the hopper.

In United Kingdom Pat. No. 1, 383,109 there is described a dusting apparatus comprising a hopper arranged to be vibrated to bring dusting powder in the hopper to a free-flowing condition. The apparatus comprises a peristaltic pump to raise the free-flowing powder from the hopper to a dusting nozzle, for dusting an electric cable which is passed through the nozzle.

It will be appreciated that it is generally undesirable to have bearings and other mechanisms operating in dusty conditions, and a mechanical agitator for the dusting powder has to be carefully arranged to ensure that the powder will not foul the mechanism.

In the use of a pump to convey powder-laden air from a hopper to a dusting nozzle, difficulty can arise in ensuring that the pump gives a steady flow; unless the flow is steady, with a substantially uniform powder density in the air, uneven and unreliable dusting of an article may occur, especially if an article such as an electric cable is to be passed through the apparatus, for dusting, at high speed. Further difficulty can arise from the formation of "holes" in the agitated powder in the hopper, which result in large variations in the powder density of the powder-laden air drawn from the hopper.

It is an object of this invention to provide an improved dusting apparatus which avoids the use both of a mechanical agitator and of a mechanical pump for conveying the powder-laden air, and which provides a steady and even flow of powder-laden air to a body to be dusted.

According to the invention a dusting apparatus comprises means operable to produce an air flow to maintain a fluidized bed of a dusting powder, and a conveying nozzle arranged to transport powder-laden air from said bed to a body to be dusted, said nozzle comprising an entry portion which in use of the apparatus is positioned within said bed to receive a portion of said air flow, a discharge portion which is positioned adjacent a body to be dusted, and a convergent portion which is arranged to accelerate the air flow within the nozzle to convey the powder-laden air between said entry and discharge portions.

In one preferred form the conveying nozzle comprises a frusto-conical portion which provides without interruption both the entry portion and the convergent portion. A straight tubular portion may lead upwards from the frusto-conical portion to a discharge portion providing a generally "T"-shaped discharge zone, so that the air flow from the tubular portion is split by the discharge portion into two flows in opposite directions along the head of the "T". The apparatus may be used to dust an elongate body (for example, an electrical wire or cable) which is passed at a steady speed through the discharge zone, along the head of the "T". The discharge portion is preferably positioned in a region above an upper limit of the fluidized bed.

For maintenance of the fluidized bed, the apparatus preferably comprises an air-permeable screen and blowing means (for example comprising a fan) for forcing an air flow upwardly through the screen. The screen may be positioned between a first chamber, in which the fluidized bed is maintained, and an expansion chamber, the blowing means being arranged to pressurize the expansion chamber so that an air flow passes through the screen to maintain the fluidized bed above the screen.

The apparatus preferably comprises filtering means so that any powder which remains in the air, after discharge from the conveying nozzle, is separated out; the clean air may then be recirculated or allowed to pass from the apparatus. The filtering means may comprise an electrostatic filter, from which separated dusting powder falls back into the dust cloud. Alternatively a rotating drum filter can be employed, with an extractor to draw air through the filter; the extractor may also reduce the pressure within the apparatus to discourage escape of dusting powder from the apparatus.

The apparatus may comprise means arranged to draw a body to be dusted at a stead speed past the discharge portion of the conveying nozzle. To control the amount of dusting powder applied to a body, and to smooth the coating applied, the body may be subjected after dusting to controlled jets of air and/or brush means. The jets of air may be projected generally radially inwards from a blowing ring through which the body is passed, to impinge upon the dusted body.

The apparatus described in U.S. Pat No. 3,886,897 comprises a rotating drum filter of a conventional kind, to filter air which is extracted from the dusting chamber. The filter comprises an axially journalled hollow cylindrical drum having a perforated curved surface supporting a replaceable paper element through which the air is drawn. Mounted adjacent the curved surface is a scraper blade which limits the thickness of dusting powder which can collect on the paper.

It has been found that for filtration of air laden with a very fine dusting powder, the conventional kind of rotating drum filter may not give a fully satisfactory performance. In particular it has been found that the provision of a scraper may not be fully satisfactory in preventing clogging of the filter, and the provision of a brush, instead of the scraper, tends to lead to an unacceptably high rate of wear of the filter element. A usual speed for rotation of a conventional filter is of the order of 30 r.p.m.

Accordingly, an apparatus in accordance with the invention preferably comprises a filter which comprises a hollow cylindrical perforated drum adapted to support on its outer cylindrical surface a sheet filter element, means whereby the air pressure within the drum can be maintained reduced to continuously draw air radially inwardly through the drum, and means adapted to rotate the drum continuously in use at sufficient speed for powder collecting on the filter element to be thrown from the element by centrifugal force so that the element is prevented from becoming clogged.

For a drum of 8 inch (20.32 cm) diameter, a suitable rotational speed has been found to be around 800 revolutions per minute to maintain the filter operating efficiently without clogging.

There now follows a description, to be read with reference to the accompanying drawings, of a dusting apparatus which is described to illustrate the invention by way of example.

Figure 2:
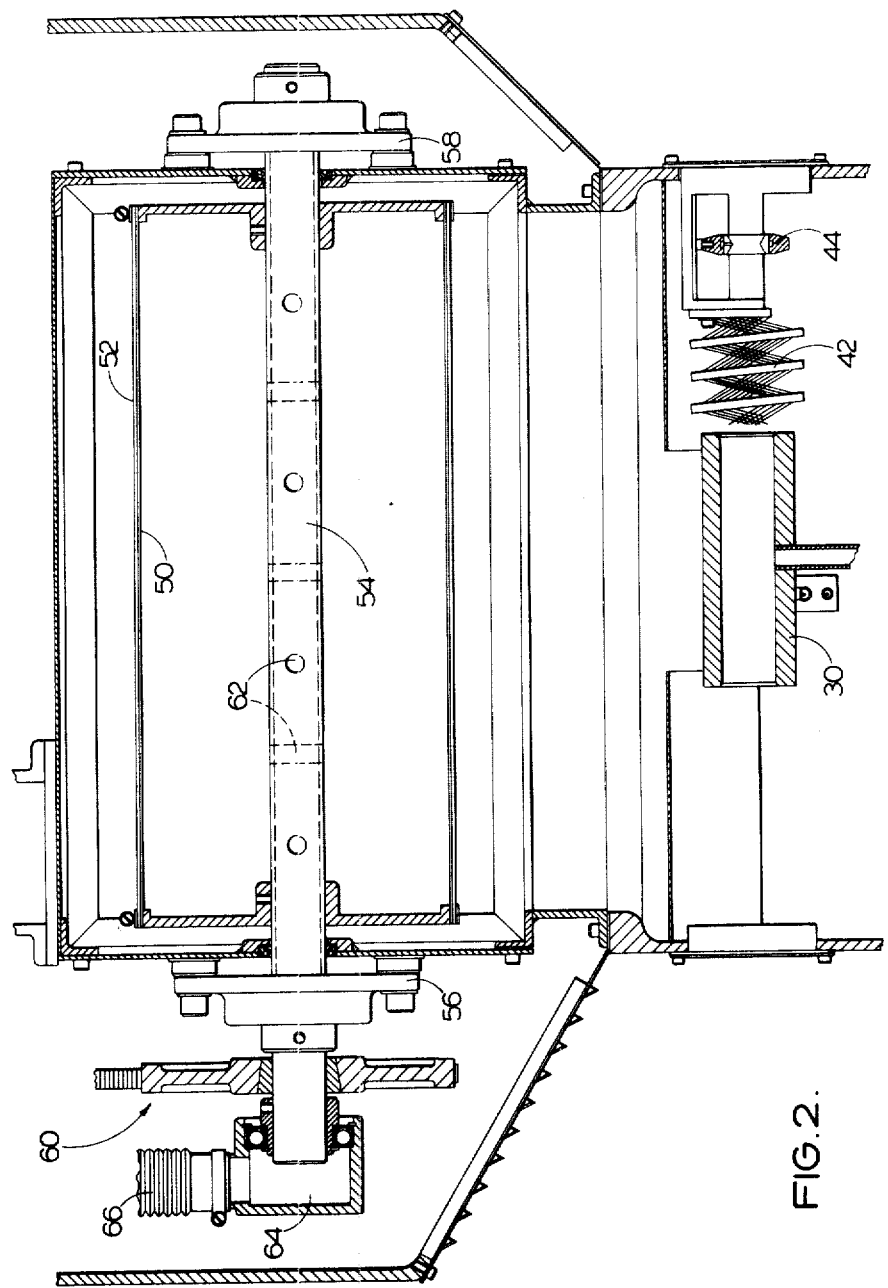

In the accompanying drawings:

FIG. 1 is a vertical section through the dusting apparatus, with filtering means removed; and FIG. 2 is a vertical section through the filtering means, viewed from the opposite side of the apparatus from FIG. 1.

The dusting apparatus comprises an outer casing 10 within which an inner casing 12 surrounds an expansion chamber 14 and a dusting chamber 16. A lower portion 18 of the casing houses air circulating means 20.

Between the expansion chamber 14 and the dusting chamber 16 is a flat, horizontal, air-permeable screen 21 of a ceramic material of approximately 35% porosity. The air circulating means 20, comprising blowing means for forcing an air flow upwardly through the screen 21, comprises a blowing fan 22, which is arranged to develop air pressure in the expansion chamber 14, and an extractor fan 23 which is arranged to draw filtered air from the top of the apparatus for recirculation of the air.

Mounted in the dusting chamber 16 is a conveying nozzle 24 of the apparatus. The nozzle comprises a vertical frusto-conical portion 26 which has an included angle at its imaginary vertex of 60°. A straight tubular portion 28 leads vertically upwards from the frusto-conical portion to a discharge portion 30 which provides a generally "T"-shaped discharge zone 32. The frusto-conical portion 26 provides both an entry portion 34, positioned adjacent the screen 21 a short distance above the screen, and a convergent portion 36, the entry portion itself being convergent. In the illustrative apparatus, the entry portion 34 is positioned ⅜ inch (0.95 cm.) above the screen 21, the tubular portion 28 has a bore of ½ inch (1.27 cm.) diameter, and the discharge portion 30 provides a transverse bore (extending transversely of the bore in the tubular portion) of 1½ inch (3.81 cm.) diameter.

The apparatus comprises means including inlet and outlet guides 37 and 39, respectively, for drawing a cable (shown as a broken line 38) at a steady speed through the dusting chamber 16, the cable passing through the transverse bore of the discharge portion 30 of the conveying nozzle 24. At a cable entry point, where the cable enters the dusting chamber, there is mounted a first air mover 40 through which the cable passes. At a cable exit point, where the cable leaves the dusting chamber, brush means 42, a blowing ring 44 and a second air mover 46 are mounted, for the cable to pass through successively. Each of the first and second air movers can operate to cause a small air flow into the dusting chamber, so as to prevent the escape of dusting powder from the chamber where the cable enters and leaves the chamber.

In use of the dusting apparatus, a quantity of a dusting powder, in the form of micro-fine talc, is put into the dusting chamber 16. Upon operation of the blowing and extractor fans 22 and 23, an air pressure of about 9 inch water pressure (22, 500 dyne/cm²) is developed in the expansion chamber 14, so that an air flow is caused to pass upwardly through the screen 21 and the dusting chamber 16 to agitate the dusting powder to develop and maintain a fluidized bed of the powder above the screen 21. The desirable upper limit of the fluidized bed is indicated by a broken line 48, the discharge portion 30 of the nozzle, and the two air movers 40 and 46, being positioned above the fluidized bed.

The conveying nozzle 24 is arranged to transport powder-laden air from the fluidized bed upwards on to a cable passing through the discharge zone 32 at a steady speed. The entry portion 34 is positioned within the fluidized bed, close to the screen 21, and receives a portion of the air flow passing through the screen. The frusto-conical portion 26, providing the convergent portion 36 between the entry portion 34 and the discharge portion 30, acts as a pressure amplifier to accelerate the air flow which enters the nozzle through the entry portion. Thus, a flow of powder-laden air enters the entry portion 34 from the fluidized bed and is accelerated by the frusto-conical portion 26, to pass up the tubular portion 28 and be discharged through the discharge portion 30 to dust an adjacent portion of the cable in the transverse bore. The air flow from the tubular portion 28 is split by the discharge portion 30 into two flows, in opposite directions along the head of the "T" of the discharge zone 32.

To control the amount of dusting powder applied to the cable, the cable is firstly subjected, after dusting, to brushing by the brush means 42. The brush means also operates to compress the coating of dusting powder on to the cable. Secondly the cable passes axially through the blowing ring 44, being subjected to controlled jets of air which are projected generally radially inwardly from the ring to impinge upon the cable.

Filtering means (FIG. 2), mounted above the dusting chamber 16, serves to separate out any powder which remains in the air after discharge from the conveying nozzle, before the air is recirculated; separated dusting powder falls back into the fluidized bed. The filtering means comprises a hollow cylindrical perforated drum 50 which supports, on its outer cylindrical surface, a sheet filter element 52. A preferred material for the element 52 is a filter material commercially available in the U.K. under the trade name GORE-TEX (Registered Trade Mark). The drum 50 is mounted on a horizontal shaft 54 for rotation in bearings 56 and 58, and drive means 60 (comprising a motor, not shown) is arranged to rotate the shaft 54 and the drum 50 continuously at a steady speed. The shaft 54 is hollow and perforated, with apertures indicated at 62, for extraction of air from the interior of the drum; one end of the shaft is housed in a suction chamber 64 which is connected by a hose 66 to the extractor fan 23 of the air circulating means 20.

The arrangement is such that the air pressure within the drum 50 can be maintained reduced by the extractor fan 23 to continuously draw contaminated air radially inwardly through the filter element 52 and the drum 50. The drive means is adapted to rotate the drum 50 continuously in use at sufficient speed for powder collecting on the filter element 52 to be thrown from the element by centrifugal force so that the element is prevented from becoming clogged. The drum is 8 inch (20.32 cm.) in diameter and is driven at 800 r.p.m.

The extractor fan 23 tends to reduce the pressure in the dusting chamber 16 to such an extent that it may not be necessary to employ the air movers 40 and 46 to seal the cable entry and exit points, since the extractor tends to cause a small air flow into the dusting chamber at these points.

Although certain dimensions for the conveying nozzle are stated above, in performance of the invention a wide variety of dimensions may be employed. For efficient operation of the apparatus it is necessary to have a correct balance of the various dimensions, but this balance can be ascertained by simple experiment.

I claim:

1. Dusting apparatus comprising a casing defining a chamber adapted to contain a quantity of a dusting powder, means whereby an air flow can be passed through said chamber to maintain a fluidized bed of the dusting powder within the chamber, and a conveying nozzle arranged to cause powder-laden air to pass, in use of the apparatus, from the bed to a body to be dusted outside the bed, the nozzle comprising an entry portion positioned within the bed to receive a portion of the air flow, a discharge portion positioned outside the bed adjacent a body to be dusted, and a convergent portion between the entry and discharge portions and arranged to cause said portion of the air flow to propel powder to the discharge portion.

2. Apparatus according to claim 1 in which said convergent portion is frusto-conical.

3. Apparatus according to claim 2 in which a frusto-conical portion of said nozzle provides both said entry portion and said convergent portion.

4. Apparatus according to claim 1 in which said discharge portion provides a generally "T"-shaped discharge zone, the air flow through the nozzle being split by the discharge portion into two flows in opposite directions along the head of the "T" to dust an elongate body extending therethrough.

5. Apparatus according to claim 1 comprising an air-permeable screen and blowing means arranged to cause an air flow upwardly through the screen for maintenance of the fluidized bed of dusting powder above the screen.

6. Apparatus according to claim 5 in which said screen is positioned between said chamber containing the dusting powder and an expansion chamber, said blowing means being arranged to pressurize said expansion chamber so that an air flow passes through the screen to maintain the fluidized bed above the screen.

7. Apparatus according to claim 1 comprising brush means arranged to engage a dusted body drawn therepast for smoothing of the powder coating applied to the body.

8. Apparatus according to claim 1 comprising a blowing ring arranged to cause air jets to be delivered generally radially inwardly from the ring to impinge upon a dusted body being drawn therethrough.

9. Apparatus according to claim 1 comprising a rotating drum filter arranged to filter the air leaving the chamber, the filter comprising a hollow cylindrical perforated drum adapted to support on its outer cylindrical surface a sheet filter element, means whereby the air pressure within the drum can be maintained reduced to continuously draw air radially inwardly through the drum, and means adapted to rotate the drum continuously in use at sufficient speed for powder collecting on the filter element to be thrown from the element by centrifugal force so that the element is prevented from becoming clogged.

10. Dusting apparatus comprising a casing defining a chamber adapted to contain a quantity of a dusting powder, means for passing an air flow through said chamber to maintain a fluidized bed of the dusting powder within the chamber, and a conveying nozzle arranged to cause powder-laden air to pass, in use of the apparatus, from the bed to a body to be dusted within said chamber but outside said bed, the nozzle comprising an entry portion positioned within the bed to receive a portion of the air flow, a discharge portion positioned within the chamber but outside the bed and adjacent a body to be dusted, and a convergent portion between the entry and discharge portions and arranged to cause said portion of the air flow to propel powder to the discharge portion, a rotating drum filter within said chamber comprising a hollow cylindrical perforated drum, filter means overlying the perforations of said drum, means for maintaining the air pressure within the drum reduced below that in the chamber to continuously draw air radially inwardly from the chamber through the drum, and means for rotating the drum continuously in use at sufficient speed for powder collecting on the filter element to be thrown from the element by centrifugal force back into the chamber so that the element is prevented from becoming clogged and unused powder is returned to the quantity within the chamber for recirculation through said nozzle.

11. The apparatus of claim 10 including an air permeable screen below said dusting powder for supporting the same, and blowing means for passing an air flow through said screen and into said chamber, said last mentioned air flow constituting the first mentioned air flow for maintaining a fluidized bed of the dusting powder within said chamber.

12. The apparatus of claim 11 including an expansion chamber below said screen, at least a portion of an upper wall of said expansion chamber being defined by said screen, said blowing means being arranged to pressurize said expansion chamber.

* * * * *